United States Patent [19]
Haldorsen et al.

[11] Patent Number: 5,148,407
[45] Date of Patent: Sep. 15, 1992

[54] METHOD FOR VERTICAL SEISMIC PROFILING

[75] Inventors: Jakob B. U. Haldorsen, Cambridge, England; Paul A. Farmer, Hinna, Norway; James F. Desler, Kingwood, Tex.

[73] Assignee: Schlumberger Technology Corporation, New York, N.Y.

[21] Appl. No.: 604,914

[22] Filed: Oct. 29, 1990

Related U.S. Application Data

[63] Continuation-in-part of Ser. No. 443,095, Nov. 27, 1989, abandoned, which is a continuation of Ser. No. 200,211, May 31, 1988, abandoned.

[30] Foreign Application Priority Data

Jun. 2, 1987 [NO] Norway ................. 872316

[51] Int. Cl.$^5$ .................... G01V 1/28; G01V 1/36
[52] U.S. Cl. ........................ 367/32; 367/57; 367/58; 364/421
[58] Field of Search ............. 367/32, 57, 58; 181/106; 364/421, 422

[56] References Cited

U.S. PATENT DOCUMENTS 2,452,515 12/1943 Athy .
3,739,871 6/1973 Bailey .
4,363,112 12/1982 Widrow ..................... 367/30
4,365,322 12/1982 Widrow ..................... 367/32
4,460,059 7/1984 Katz .
4,922,362 5/1990 Miller et al. .
4,926,391 5/1990 Rector et al. .

FOREIGN PATENT DOCUMENTS 294157 7/1988 Burma .

OTHER PUBLICATIONS

Mons et al; "Multi-Offset VSP Profiling"; May 9, 1985, 17th Annu. SPE of AIMB OTC, vol. 4, pp. 441-452; abstract only provided.
Greenhalgh et al; "Imaging of VSP Data"; Explor. Geoph. Australia). vol. 17, #2, pp. 81-85, Jun. 1986; abstract only provided.
Kostov, C.; "Seismic Reflection . . . Drill Bit Source"; Nov. 2, 1989, 59th Annu. Soc. Exp. Geoph. Mtg., vol. 1, pp. 1-4; abst. only provided.
J. F. Claerbout and S. M. Doherty, "Downward Continuation of Moveout Corrected Seismograms," *Geophysics*, vol. 37, No. 5, pp. 741-768 (Oct. 1972).
E. A. Robinson and S. Treitel, *Geophysical Signal Analysis*, pp. 34-35, 385-394 (1980).
K. Aki and P. G. Richards, *Quantitative Seismology Theory and Methods*, pp. 576-577, 584-585 (1980).

Primary Examiner—Nelson Moskowitz
Attorney, Agent, or Firm—Synnestvedt & Lechner

[57] ABSTRACT

Method of vertical seismic profiling in drilling operations utilizing the drill bit for a source of seismic energy without any break in drilling operations. The noise of the drill bit and reflections of the noise in the formation are recorded with the aid of a geometrically extended array of receivers which are provided in a predetermined matrix group. The received signals are analyzed according to velocity and migration principles per se on the basis of differences in reception times, by which the noise signature of the drill bit can be determined at any desired location during drilling operations and extracted from the traces. The remaining received signal frequencies and signal amplitudes are analyzed in relation to their deviation in time, the signals being grouped according to time differences corresponding to focusing on certain areas in the formation. Preferably, the method comprises the steps of gathering data from seismic traces with a plurality of receivers forming an array on the earth surface, performing velocity analysis on the seismic traces to obtain a velocity of the earth formation and to apply moveout corrections to each of the traces gathered by the plurality of receivers, constructing a downward continuation filter for the seismic traces to obtain an estimate of the source drill bit signature, and extracting the source drill bit signature from the moveout-corrected seismic traces with the downward continuation filter to obtain seismic profiles of the earth formations.

23 Claims, 4 Drawing Sheets

METHOD FOR VERTICAL SEISMIC PROFILING

RELATED APPLICATIONS

This application is a continuation-in-part of application Ser. No. 443,095, filed on Nov. 27, 1989, now abandoned, which was a continuation of application Ser. No. 200,211, filed May 31, 1988, now abandoned.

BACKGROUND OF THE INVENTION

1. Field of the Invention

The invention relates to methods for vertical seismic profiling (VSP) of earth formations in response to acoustic waves from a source in the earth, particularly an operating drill bit, and to methods for conducting such vertical seismic profiling without interrupting the drilling operation.

2. Description of the Prior Art

Vertical seismic profiling is usually done by pulling the drill string out of the drilling hole, then lowering a seismic listening device (geophone) into the hole, and listening to or recording the acoustic energy transmitted from a seismic source at the surface. This operation involves a stop or break in drilling activity and thus, a significant increase of the cost of the drilling operation in addition to the cost of the actual profiling operation.

In order to simplify profiling techniques, attempts have been made in the past to provide sources of seismic energy, both of the continuous-wave and impulsive kind, in a downhole position. In all these cases, knowledge of the source signature was required for processing the data. The source "signature" is the wavefront expression of the acoustic energy that propagates directly from the source to a receiver, without reflection. Such knowledge of the source signature has, however, been unreliable due to unpredictable coupling of the source through the walls of the well.

Various methods have been proposed to avoid this problem, involving use of arbitrary, unknown, buried sources and surface recording. U.S. Pat. Nos. 2,452,515 and 3,739,871 describe examples of such methods.

According to U.S. Pat. No. 2,452,515, surface recording of acoustic energy generated by the drill bit is used to obtain information on the nature of the material of the formation that is actually being ground by the bit. The method according to that patent, however, provides only such information, and nothing is mentioned in the specification as to how the drill bit may be used as a source of acoustic energy in such a manner that it permits analysis of other areas of the formation, and in particular it does not disclose how to separate acoustic energy from different sources.

According to U.S. Pat. No. 3,739,871, a buried or submersed source is used, and acoustic energy signals are recorded on the surface. The method disclosed in this latter specification will only work with impulsive sources, and the acoustic waves are formed by hydraulic fracturing. It uses an array of geophones on the surface, and the acoustic waves received are used to determine an accurate location of the fracturing and the degree of fracturing. No attempt is made to derive seismic reflection data.

It is an object of the present invention to provide a new and improved method for carrying out vertical seismic profiling to determine the local geology surrounding a drilling well.

It is a further object of the invention to carry out such profiling without any break in drilling operations, and by using the drill bit itself as a source of seismic energy, while providing for this method to be carried out to maximum advantage, both economically and operationally.

BRIEF SUMMARY OF INVENTION

These objects are achieved by a method for carrying out measurements during the actual drilling operation, the acoustic energy from the drill bit, with reflections thereof occurring in the formation, being recorded with the aid of a geometrically extended array constructed of individual receivers which are arranged in a predetermined matrix group. The signals received are analyzed on the basis of differences in arrival times, so as to determine the noise signature of the drill bit at any desired location during drilling operations. Having determined an estimate of the drill bit signature, a deconvolution filter can be constructed for transforming the recorded data to a data set similar in character to what would have been recorded had an impulsive source at the location of the drill bit been used and direct and reflected waves been recorded on the surface.

According to a further feature of the invention the geometrical extent of the geophone array in width and length is preferably of the same order of size as the approximate depth of the drill bit beneath the earth's surface.

More particularly, in accordance with the present invention there is provided a method of vertical seismic profiling of earth formations in which a bore hole is drilled through the formation by a drill bit, which acts as a continuous, time-extended, non-impulsive source of acoustic energy. Preferably the method comprises the steps of gathering data from seismic traces with a plurality of receivers forming an array on the earth surface, performing velocity analysis on the seismic traces to obtain a velocity of the earth formation between the drill bit and the receivers and to apply moveout corrections to each of the traces gathered by the plurality of receivers, constructing a downward continuation filter for the seismic traces to obtain an estimate of the source drill bit signature, and extracting the source drill bit signature from the seismic traces using the downward continuation filter.

BRIEF DESCRIPTION OF THE DRAWINGS

The invention will now be described in detail with reference to the accompanying drawings wherein.

DETAILED DESCRIPTION OF PREFERRED EMBODIMENTS

Figure 1:
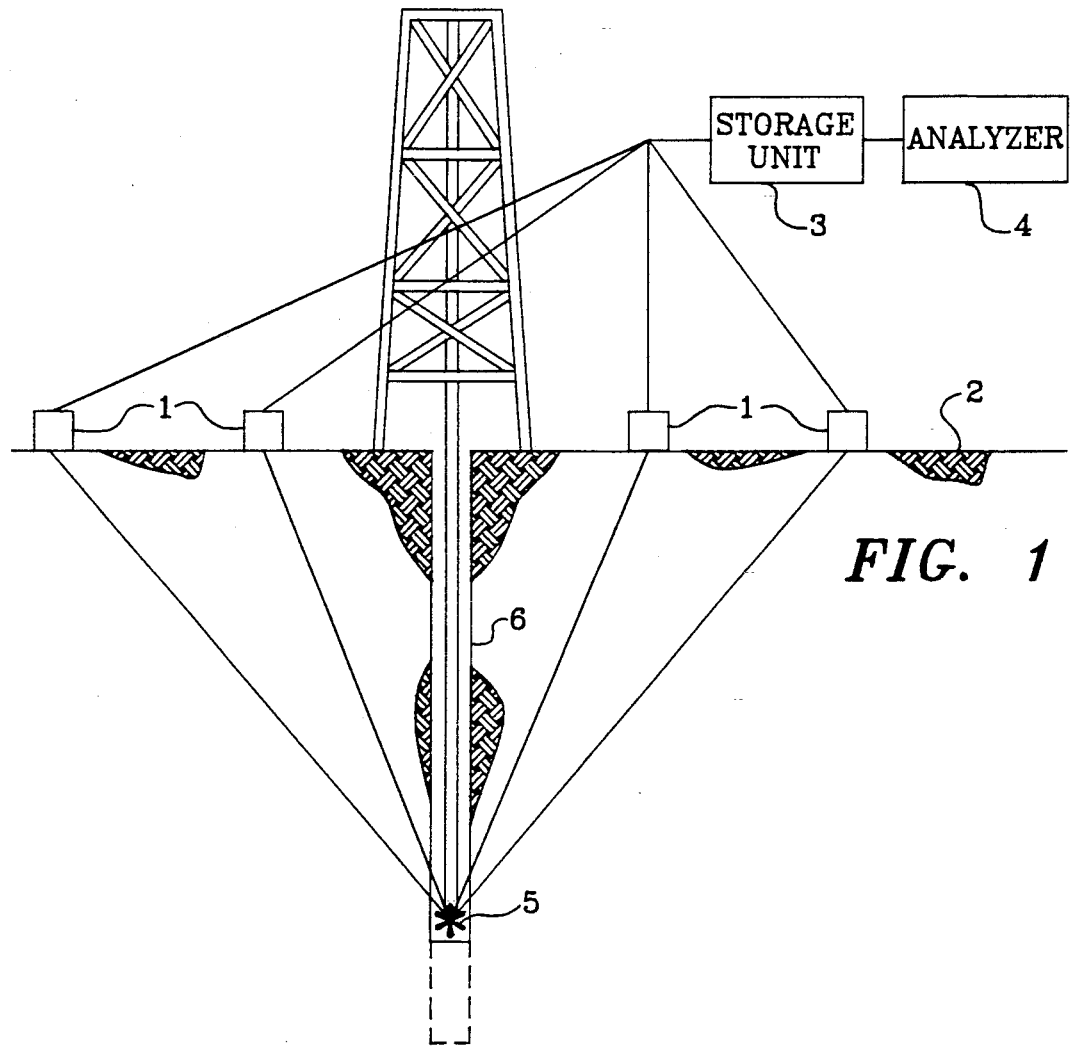
FIG. 1 is a schematic vertical sectional view of a drill site, and of elements for carrying out the invention.
Figure 2:
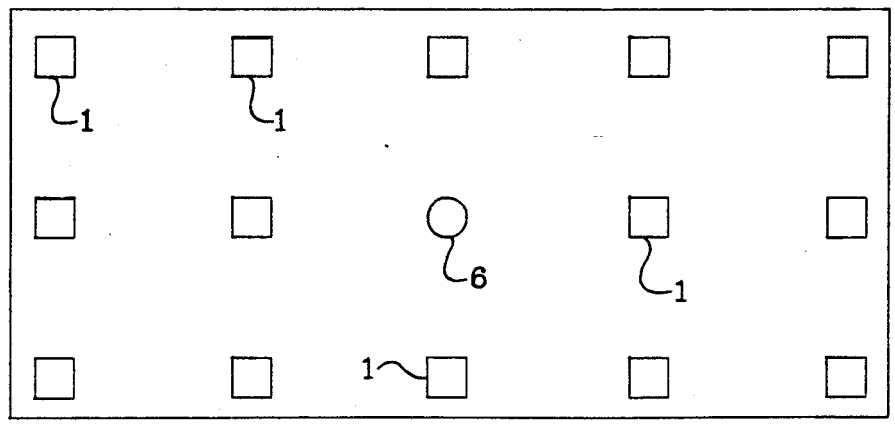
FIG. 2 is a schematic plan view showing the positions of the receivers in FIG. 1.

Referring now to the specific embodiment of the invention shown in the drawings by way of example only, and without thereby in any way limiting the scope of the invention, an array for use in the method of the invention is schematically shown in FIGS. 1 and 2. The array comprises separate receivers 1, such as geophones, arranged in a regular matrix group as shown in FIG. 2, in an area on the surface 2 of the earth formation at the drilling site. The array is connected with acoustic-signal storage unit 3 and acoustic-signal analyzer 4, respectively, for the received signals. The receivers are preferably arranged in a rectangular pattern of rows and columns as shown. The extent of the array in the directions of width and length is preferably of the same order as the depth below the surface of the drill bit 5 in the bore hole 6. As will be described more fully hereinafter, the storage unit is used to store the separate signals from the receivers, and the analyzer performs the analysis on the stored signals which produces the desired seismic profiling.

The method of the present invention does not require previous knowledge of the signature of the seismic source, the signature being deduced from the data recorded at the surface. This permits use of the method with any arbitrary generator of acoustic energy which may be placed at a desired location. One technique which is used in the preferred embodiment of this invention is known as migration, and is described in J. F. Claerbout, and S. M. Doherty, 1972 "Downward Continuation of Moveout Corrected Seismograms", Geophysics, Vol. 37, pp. 741-768. This is, in essence, a focusing technique.

The present invention is fundamentally different from the methods disclosed in the above-mentioned two U.S. patents, and from a combination of these methods as well, because with the method according to the present invention a three-dimensional technique of focusing is used, which is rendered possible by utilization of a receiver matrix extending over a large area. Also, it is the utilization of the matrix that permits forming a seismic section of reflection by migration and deconvolution of the recorded data.

The drill bit continuously generates acoustic energy by grinding material adjacent to the bit. The acoustic energy thus produced will be subjected to the same reflections and refractions by various acoustic conditions in the adjacent earth formation as acoustic energy emitted from a specially built seismic source would be.

The matrix of receivers, or listening elements, at the surface records the energy transmitted directly from the drill bit to the surface, as well as energy reflected by the acoustic inhomogeneities in the earth formation. The energy emitted from the drill bit at each given location thereof will arrive at the different receivers in the matrix at different times, the relative delays being determined by the difference in length of propagation path and the seismic velocity of the transmitting medium. The analyzer 4, by exercising delays on the data from the separate receivers storage in storage unit 3, in effect focuses the array formed by the receivers on any volume element in the formation, and records the acoustic energy propagated through the volume element. By focusing the array on the drill bit, the previously unknown acoustic signature of the drill bit is extracted. When this signature is thus determined, the stored data can be processed by use of standard deconvolution techniques in the same manner as is used for data recorded from seismic oscillators.

Instead of using time delays for focusing the array, it is possible to use phase displacement after the data have been transformed to the frequency and wave number domain from the time and space domain, as is known in the art. These techniques are mathematically equivalent.

The geometrical matrix or array consisting of a number of receivers preferably has comparatively large area in all directions of the plane of the array. It is suitably designed with the same order of size, in breadth and length, as the assumed approximate depth of the drill bit. In this array the separate receivers are preferably provided in a regular pattern or matrix and are preferably provided at the surface close to the drilling site. The array, i.e. the separate receivers as shown, are either connected with a storage unit for the extracted data or may be supplied directly to an analyzing unit. If measurements are made at sea, the array will normally be deployed on the bottom of the sea. The receivers are preferably arranged in a rectangular pattern of rows and columns as shown in FIG. 2.

The following will indicate preferred dimensions of such a matrix or array. The receiver elements should cover an area that is large enough to allow an angle of incidence of at least 45° for acoustic energy from the drill bit. With angles substantially smaller than that, the resolution will decrease undesirably. This means an array of approximately 3000 m by 3000 m with the borehole at its center in the case of well depth of 1500 m. The receivers may, in case of deep wells, be provided along, for example, a line of 5 km length which is arranged radially about the well bore with the elements at a mutual distance of 25 m, which means approximately 200 receiver channels. An additional parallel line with a corresponding distribution may be provided alongside the first mentioned line. Thus it is contemplated that arrays for use in methods provided in accordance with the present invention need not be multidimensional and in large arrays in which the costs of using a large number of receivers becomes excessive, a linear array will often suffice. Recordings should be made at regular intervals during drilling operations.

The recorded data are analyzed with the aid of techniques known in the art, the signature of the drill bit being extracted as mentioned. Analysis systems that may be used to this end are, for example, described in J. F. Claerbout and S. M. Doherty, 1972 "Downward Continuation of Moveout Corrected Seismograms," Geophysics. Vol. 37, pp. 741-768.

Figure 3:
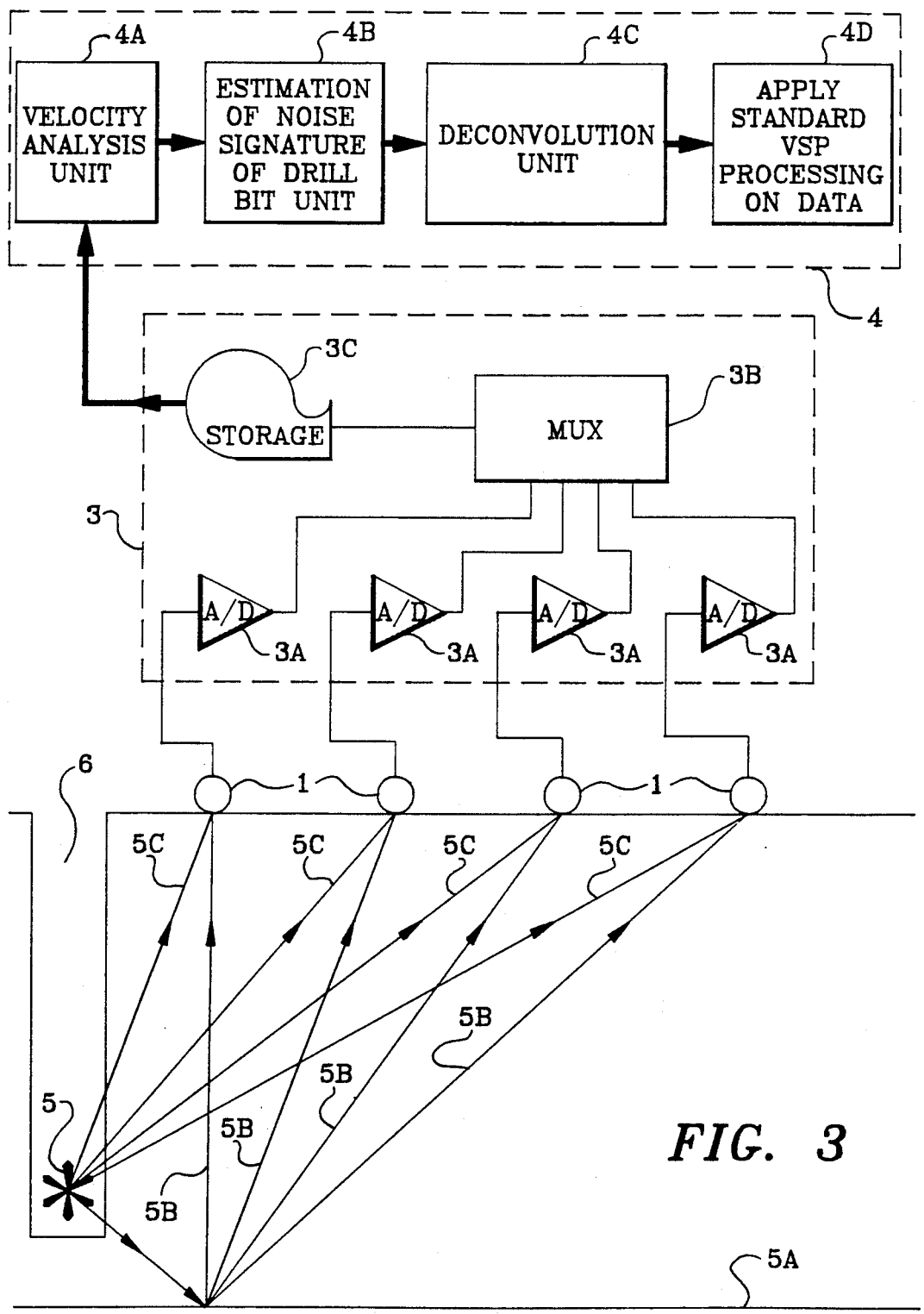
FIG. 3 is a schematic diagram, partly, in block form, of a vertical seismic profiling system provided in accordance with the present invention.

The special processing techniques applied to the recorded data involves three major steps: velocity analysis, estimation of the noise signature of the drill bit, and deconvolution. Referring to FIG. 3, a block diagram of a processing system provided in accordance with the present invention is shown for a preferred embodiment. The source 5 at the bottom of the hole 6 outputs acoustic body waves. A reflecting interface 5A reflects waves 5B to the receivers 1 on the surface. Additionally, direct acoustic waves 5C from source 5 propagate through the earth to the receivers. Each receiver element is operatively connected to a separate analog-to-digital (A/D) converter 3A in the storage unit 3. The A/D's 3A digitize the signals from receivers 1 which are then multiplexed in a multiplexer (MUX) 3B and stored on a conventional computer tape or disk 3C.

The data stored on tape or disk are then input to a velocity analysis unit 4A in the analyzing unit 4. The velocity analysis unit preferably determines the acoustic velocity of the formation between the receivers and the drill bit. An estimation unit 4B, then preferably determines an estimate of the noise signature of the drill bit with a software filter. It will be understood that all of the analyzing which occurs in analyzer 4 is preferably done by a computer program in a digital computer.

In still further preferred embodiments, a deconvolution unit 4C automatically constructs a deconvolution filter to transform the traces to data sets which are similar to walkaway VSP data. This leaves the desired data, which contains information about the reflecting interface 5A 10 remaining in the traces, and which can then be analyzed in block 4D using standard VSP processing. The following description of the separate processing steps preferably employed provides the detail of the best mode of practicing the invention.

Data Gathering

Figure 4A:
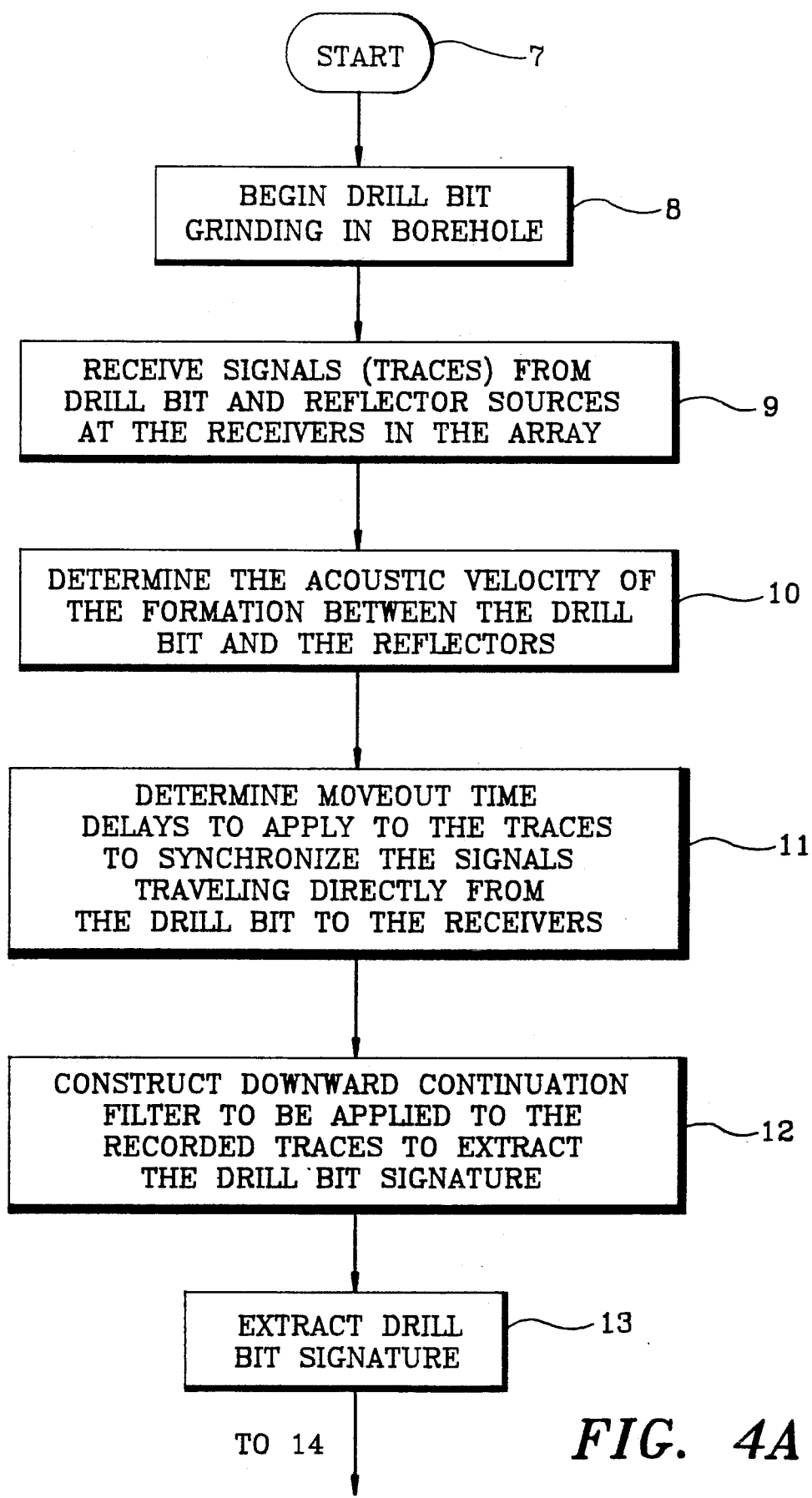
FIGS. 4A and 4B constitute a flow chart of a preferred embodiment of the process for extraction and use of a drill bit signature in accordance with the present invention.
Figure 4B:
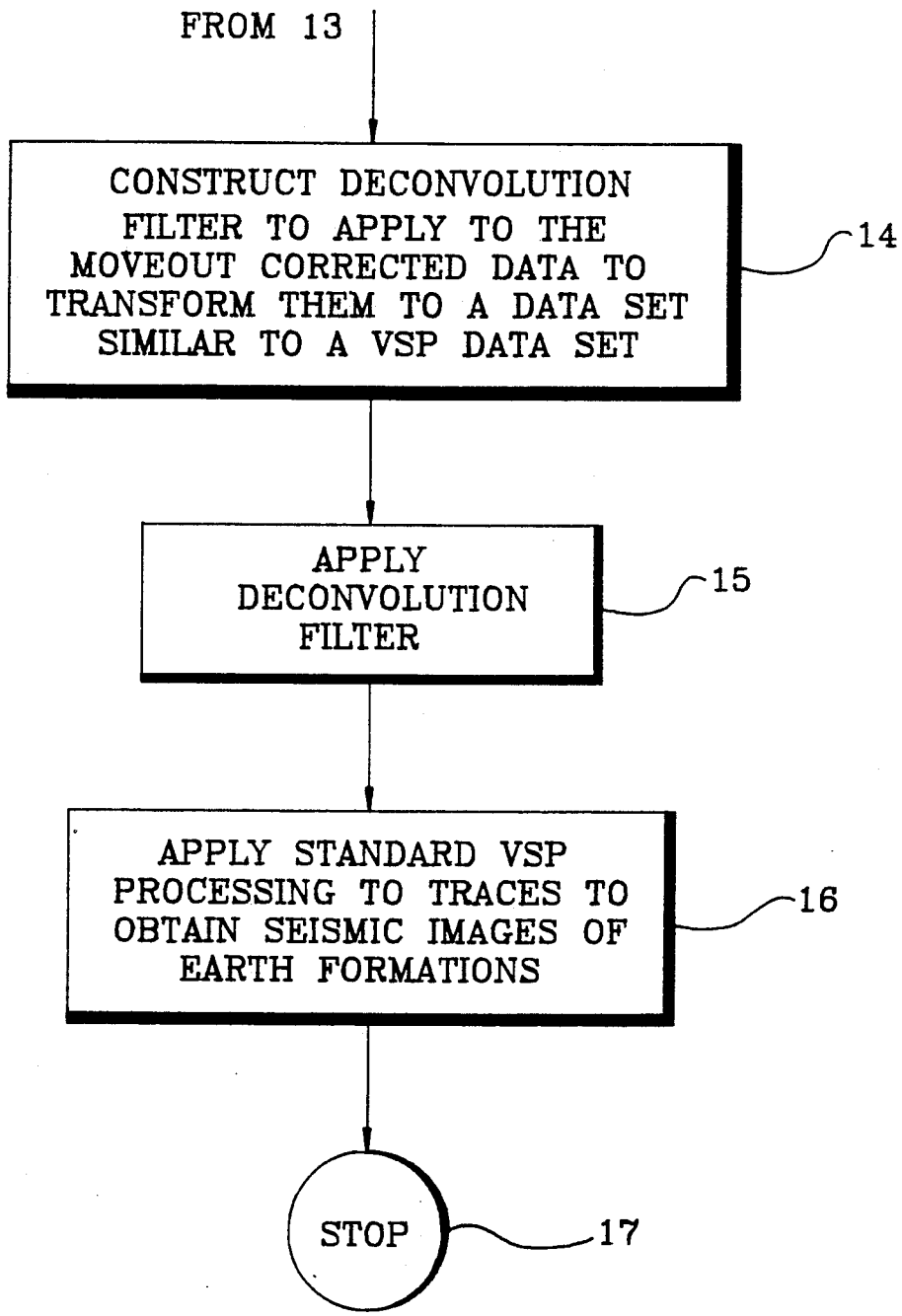

Referring to FIGS. 4A and 4B, a flow chart embodying a preferred method for practicing the present invention starts at step 7. The steps in this flow chart are numbered to be consecutive with numerals in the other drawings. At step 8, the drill bit 5 is activated from the surface at the drilling site. Drill 5 then begins to grind through the formation to deepen bore hole 6.

During the drilling of the bore hole, the impact of the drill bit on the rock generates acoustic waves, as is known by those skilled in the art. The term "acoustic waves" as used herein describes both compressional and shear waves, the methods provided in accordance with the present invention being applicable to both shear waves and compressional waves. Acoustic waves produced by the drill bit propagate to the earth's surface carrying information about subsurface velocities, drill bit location and reflectors in the formation. The geophones 1 on the surface also receive acoustic energy from waves scattered at impedance contrasts in rock formations. Thus, to image the subsurface formations from data received during drilling, in preferred embodiments it is desired to separate the effects of the wave fields corresponding to different reflectors and the source by signature deconvolution that compresses a long signal from the drill bit source into an impulse.

It is the general purpose of seismic methods of exploration for resources to use reflected acoustic energy to extract information about material properties in the subsurface. When a source with extended signature, i.e. non-impulsive, is used, such as an operating drill bit, waves travelling directly from that source to the receivers overlap both in space and in time with energy reflected from different interfaces or inhomogeneities, and arrive at the receivers or geophones 1. Thus, the drill bit 5 acts as a source of acoustic waves while it is rotating, but the signature of the noise generated by the drill bit is unknown, uncontrolled and highly dependent upon the design of the drill bit, the speed of rotation, and the particular materials in the bore hole.

Data Analysis

At step 9, acoustic body wave energy is generated by the drill bit and received at the receivers in the array. Some of the energy travels directly from the drill bit 5 to the receivers 1, which are commonly called "direct waves," and some of the energy arrives at the receivers after having been reflected from acoustic reflectors in the earth formation, which are commonly called "reflected waves." The sequence of signals received by a geophone is called a "trace" which thus carries information both about direct and reflected waves.

If the drill bit is at a position $(x_0, z_0)$ and a receiver, m, is at a position $(x_m, z_m)$, the time a signal will take to travel the distance from the drill bit to the receiver m will be:

$$t_m = 1/c \sqrt{(x_m - x_0)^2 + (z_m - z_0)^2} \; ; \quad (1)$$

where c is the velocity of the formation. This relation follows from elementary geometry and physics after the simplifying assumption is made that the acoustic velocity of the medium can be approximated by a single average velocity.

At step 10, it is preferred to determine the acoustic velocity of the medium between the drill bit and the receivers. If detailed information about the acoustic velocity in the formation is available, this knowledge can be used to explicitly calculate the transmissions times $t_m$ for each individual receiver. If such information is either unreliable or unavailable, the formation velocity can estimated as follows.

The increase of transmission times, $t_m$, with increasing distance between source and receivers as described by the above equation is called "moveout correction." A family of moveout curves giving the relation between transmission times, $t_m$, and receiver positions, $x_m$, can be parameterized according to the drill bit location $(x_0, z_0)$ and the velocity c. Applying the time delays $t_m$ to the traces is called "applying moveout corrections." By applying moveout corrections provided in accordance with the present invention, waves emitted at location $(x_0, z_0)$ and transmitted through a formation with acoustic velocity c are synchronized.

In further preferred embodiments of the present invention, the energy in the wave thus synchronized by moveout corrections can be measured by a quantity defined as the "stacking coherency." The stacking coherency function used in accordance with the invention is defined as:

$$E(c, t_m) = \frac{1}{N} \sum_\omega \frac{\frac{1}{M} \left| \sum_m S_m(\omega) e^{-i\omega t_m} \right|^2}{\frac{1}{M} \sum_m |S_m(\omega)|^2}, \quad (2)$$

where $t_m$ is a function of $(x_0, z_0)$ as described in equation 1, N represents the number of frequencies in a Fourier transform of the received waveforms, M represents the number of receivers in the geophone array, and $S_m$ represents the waveform at receiver m after Fourier transformation.

Assuming the drill bit location $(x_0, z_0)$ is known, in preferred embodiments the average formation velocity is taken to be the particular velocity that makes the stacking coherency the largest. In still further preferred embodiments, the moveout times corresponding to the average formation velocity as determined above are calculated and applied to the traces to synchronize the waves coming directly from the drill bit at step 11.

Extraction of the Drill Bit Signature

After velocity analysis as described above is performed, a downward continuation filter is preferably constructed at step 12, and applied to the family of moveout synchronized traces to extract the drill bit signature. In accordance with the present invention, an estimate of the drill bit signature is derived by spatial averaging of the moveout-corrected traces.

The estimate of the acoustic noise signature of the drill bit, f(ω), for a given frequency, ω, can be calculate from the following expression:

$$f(\omega) = \frac{1}{M} \sum_{m=1}^{M} S_m(\omega) e^{-i\omega t_m}, \quad (3)$$

which is defined as a "downward continuation by wavefield extrapolation" and is described in J. F. Claerbout and S. M. Doherty, "Downward Continuation of Moveout Corrected Seismograms," Geophysics, Vol. 37, pp. 741-768 (1972), the teachings of which are specifically incorporated herein by reference. Using this estimate in the frequency domain of the source drill bit signature, a software filter is preferably constructed by a computer program and the drill bit signature is extracted at step 13.

Deconvolution

Using this estimate of the drill bit signature derived above, a deconvolution filter is further constructed at step 14 to be applied to the moveout-corrected data to transform the data to a data set which preferably resembles a walkaway VSP data set. The deconvolution filter is preferably designed by taking the inverse amplitude at each frequency and multiplying by the amplitude, D(ω), of a signature with a desired shape. This yields the following form for the filter:

$$F(\omega) = \frac{\bar{f}(\omega)}{|f(\omega)|^2} [D(\omega)] \quad (4)$$

where $\bar{f}(\omega)$ is the complex conjugate of f(ω) and $$\frac{\bar{f}(\omega)}{|f(\omega)|^2} \quad (5)$$

is the inverse amplitude of f(ω).

In order to account for travel time, in preferred embodiments the wavelet signature of the source is set to:

$$D(\omega) = e^{i\omega t_m}, \quad (6)$$

which indicates that the wavelet is a time-shifted impulse function in the frequency domain.

F(ω) can then be applied to the moveout-corrected traces at step 15 in FIG. 4B which transforms this data into a data set which, after subsequent Fourier transformation, has the same characteristics as a data set that would have been recorded with surface receivers if an impulsive source were used at the position of the drill bit. The source signature is, in effect, thereby reduced to an impulsive-type source and the data reflections are reduced to that which would result through acoustic stimulation from an impulsive source.

Thus, the drill bit signature can be extracted from the moveout-corrected family of traces and a deconvolution filter applied, so that at step 16 standard VSP processing can be applied to the traces to obtain seismic images of the earth formation. The method then stops at step 17.

The wave velocity estimation and deconvolution techniques herein described are preferably accomplished on a standard, digital computer which in today's technical environment may be on-site. The data received at the array of geophones 1 and stored in storage unit 3 for analysis in the analyzer 4 can thus be processed to obtain moveout-corrected data traces and extracted drill bit signatures, so that deconvolution can prepare the signals for further well known VSP processing. Such results have not heretofore been effectively achieved in the seismic data processing art and solve a long-felt need for methods of VSP processing using a continuous, acoustic wave drill bit signature as a source, and an array of receiving geophones without having to stop the boring process.

There have thus been described certain preferred embodiments of vertical seismic profiling provided in accordance with the present invention. While preferred embodiments have been described and disclosed, it will be recognized by those with skill in the art that modifications thereof are within the true spirit and scope of the invention. The appended claims are intended to cover all such modifications.

We claim:

1. A method of vertical seismic profiling of earth formations in which a bore hole is drilled through the formation by a drill bit, which acts as a continuous, time-extended, non-impulsive source of acoustic energy comprising the steps of:
   gathering data from seismic traces with a plurality of receivers forming an array on the earth surface;
   performing velocity analysis on the seismic traces to obtain a velocity of the earth formation between the drill bit and the receivers and to apply movement corrections to each of the traces gathered by the plurality of receivers;
   constructing a downward continuation filter for the seismic traces to obtain an estimate of the source drill bit signature by determining a spatial average of the moveout-connected traces, thereby obtaining an estimate of the source drill bit signature; and
   extracting the source drill bit signature from the seismic traces using the downward continuation filter where the spatial average of the moveout-corrected traces follows the form:

$$f(\omega) = \frac{1}{M} \sum_{m=1}^{M} S_m(\omega) e_m^{-i\omega t},$$

where, N is the total number of traces, $S_m(W)$ are the downgoing waves in earth formation between the receivers and the reflecting interface, and $t_m$ is the moveout time.

2. The method recited in claim 1 further comprising the step of deconvolving the estimate of the drill bit signature by a filter to transform the seismic traces to a data set resembling a walkaway vertical seismic profiling data set.

3. The method recited in claim 2 wherein the filter which deconvolves the estimate of the drill bit signature follows the form:

$$F(\omega) = \frac{\bar{f}(\omega)}{|f(\omega)|^2} [D(\omega)]$$

where $\bar{f}(\omega)$ is the complex conjugate of f(ω), $$\frac{\bar{f}(\omega)}{|f(\omega)|^2}$$

is the inverse amplitude of f(ω), and

D(ω)

is a signature of the source drill bit.

4. The method recited in claim 3 wherein the signature of the source drill bit follows the form:

$$D(\omega)=e^{i\omega t_m},$$

where, $t_m$ is the time it takes an acoustic wave to travel from a position of the drill bit in the earth to the receivers in the array.

5. The method recited in claim 4 wherein the receivers are positioned in the array with a breadth and length substantially the same as the depth of the drill bit in the earth.

6. The method recited in claim 5 wherein the receivers in the array are arranged in a substantially rectangular pattern of rows and columns.

7. A method for obtaining vertical seismic profiles of an earth formation in which there is located an acoustic wave source having a time-extended, non-impulsive signature, comprising the steps of:
   (a) providing an array of acoustic wave receivers spaced apart over the earth's surface to produce from said receivers, in response to acoustic waves from said source, a group of seismic waveforms;
   (b) determining an acoustic velocity of the earth formation between the acoustic wave source and the receivers in the array;
   (c) applying moveout correction to said group of seismic waveforms to compensate for the differences in the travel time of said seismic waveforms from said source to said receivers;
   (d) applying to said seismic waveforms a downward continuation filter to focus the array on the location of said source by determining a spatial average of the moveout-corrected seismic waveforms, thereby obtaining an estimate of the acoustic wave source signature; and
   (e) extracting said acoustic wave source signature from said focused, moveout-corrected seismic data sets to produce seismic profiles of the earth formation "wherein the spatial average of the moveout-corrected seismic waveforms follows the form:

$$f(\omega) = \frac{1}{M} \sum_{m=1}^{M} S_m(\omega) e^{-i\omega t_m},$$

where, M is the total number of traces, $S_m(w)$ are the downgoing waves in the earth formation between the receivers and the reflecting interface, and $t_m$ is the moveout time".

8. The method recited in claim 7 wherein the array of receivers is a linear array of receivers.

9. The method recited in claim 7 wherein the array of receivers is a multi-dimensional array.

10. The method recited in claim 9 wherein the multi-dimensional array is a two-dimensional array.

11. The method recited in claim 10 further comprising the step of deconvolving the estimate of the acoustic wave source signature to transform the seismic waveforms to a data set that resembles a walkaway vertical seismic profiling data set.

12. The method recited in claim 11 wherein the deconvolving step comprises the steps of:
   constructing a deconvolution filter by taking the inverse amplitude at each frequency of the Fourier transform of the acoustic wave source signature; and
   multiplying the inverse amplitude at each frequency by an impulsive response for the source drill bit signature.

13. The method recited in claim 12 wherein the deconvolution filter follows the form:

$$F(\omega) = \frac{\bar{f}(\omega)}{|f(\omega)|^2} [D(\omega)]$$

where $\bar{f}(\omega)$ is the complex conjugate of $f(\omega)$, $$\frac{\bar{f}(\omega)}{|f(\omega)|^2}$$

is the inverse amplitude of $f(\omega)$, and $$D(\omega)$$

is a signature of the acoustic source.

14. The method recited in claim 13 wherein the signature of the acoustic wave source follows the form:

$$D(\omega)=e^{i\omega t_m},$$

where, $t_m$ is the time it takes an acoustic wave to travel from a position of the acoustic wave source in the earth to the receivers in the array.

15. The method recited in claim 14 wherein the receivers are positioned in the two-dimensional array with a breadth and length substantially the same as the depth of the acoustic wave source in the earth.

16. The method recited in claim 15 wherein the receivers in the two-dimensional array are arranged in a substantially rectangular pattern of rows and columns.

17. A method for obtaining vertical seismic profiles of an earth formation in which there is located an acoustic wave source having a time-extended, non-impulsive signature, comprising the steps of:
   (a) providing an array of acoustic wave receivers spaced apart over the earth's surface to produce from said receivers, in response to acoustic waves from said source, a group of seismic waveforms;
   (b) determining an acoustic velocity of the earth formation between the acoustic wave source and the receivers in the array;
   (c) applying moveout correction to said group of seismic waveforms to compensate for the differences in the travel time of said seismic waveforms from said source to said receivers;
   (d) determining a spatial average of the moveout-corrected seismic waveforms, thereby obtaining an estimate of the acoustic wave source signature wherein the spatial average of the moveout-corrected traces follows the form:

$$f(\omega) = \frac{1}{M} \sum_{m=1}^{M} S_m(\omega) e^{-i\omega t_m},$$

where, M is the total number of traces, $S_m(w)$ are the downgoing waves in the earth formation between the receivers and the reflecting interface, and $t_m$ is the moveout time, (e) extracting said acoustic wave source signature from said moveout-corrected seismic data sets; and (f) deconvolving the estimate of the acoustic wave source signature to transform the seismic waveforms to a data set that resembles a walkaway vertical seismic profiling data set.

18. The method recited in claim 17 wherein the deconvolving step comprises the steps of:

constructing a deconvolution filter by taking the inverse amplitude at each frequency of the Fourier transform of the acoustic wave source signature; and multiplying the inverse amplitude at each frequency by an impulsive response for the source drill bit signature.

19. The method recited in claim 18 wherein the deconvolution filter follows the form:

$$F(\omega) = \frac{\bar{f}(\omega)}{|f(\omega)|^2} [D(\omega)]$$

where $\bar{f}(\omega)$ is the complex conjugate of $f(\omega)$, $$\frac{\bar{f}(\omega)}{|f(\omega)|^2}$$

is the inverse amplitude of $f(\omega)$, and $$D(\omega)$$

is a signature of the acoustic wave source.

20. The method recited in claim 19, wherein the signature of the acoustic wave source follows the form:

$$D(\omega) = e^{i\omega t_m},$$

where, $t_m$ is the time it takes an acoustic wave to travel from a position of the acoustic wave source in the earth to the receivers in the array.

21. The method recited in claim 20 wherein the array of receivers comprises a two-dimensional array.

22. The method recited in claim 21 wherein the receivers are positioned in the two-dimensional array with a breadth and length substantially the same as the depth of the drill bit in the earth.

23. The method recited in claim 22 wherein the receivers in the two-dimensional array are arranged in a substantially rectangular pattern of rows and columns.

* * * * *